United States Patent
Carlson et al.

(10) Patent No.: US 10,387,885 B2
(45) Date of Patent: Aug. 20, 2019

(54) SKU LEVEL CONTROL AND ALERTS

(75) Inventors: Mark Carlson, Half Moon Bay, CA (US); Patrick Stan, Pacifica, CA (US); Patrick Faith, Pleasanton, CA (US); Ayman Hammad, Pleasanton, CA (US); Ben Rewis, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 1329 days.

(21) Appl. No.: 12/767,335

(22) Filed: Apr. 26, 2010

(65) Prior Publication Data

US 2010/0299249 A1     Nov. 25, 2010

Related U.S. Application Data

(60) Provisional application No. 61/173,371, filed on Apr. 28, 2009.

(51) Int. Cl.
| | | |
|---|---|---|
| *G06Q 40/00* | (2012.01) | |
| *G06Q 20/42* | (2012.01) | |
| *G06Q 20/10* | (2012.01) | |
| *G06Q 20/32* | (2012.01) | |

(52) U.S. Cl.
CPC .......... *G06Q 20/425* (2013.01); *G06Q 20/10* (2013.01); *G06Q 20/32* (2013.01); *G06Q 20/3221* (2013.01); *G06Q 20/3223* (2013.01); *G06Q 20/42* (2013.01); *G06Q 40/00* (2013.01)

(58) Field of Classification Search
CPC .................................................... G06Q 40/00
See application file for complete search history.

(56) References Cited

U.S. PATENT DOCUMENTS

| | | |
|---|---|---|
| 5,448,471 A | 9/1995 | Deaton et al. |
| 5,483,444 A | 1/1996 | Heintzeman et al. |
| 5,513,250 A | 4/1996 | McAllister |
| 5,530,438 A | 6/1996 | Bickham et al. |
| 5,592,560 A | 1/1997 | Deaton et al. |
| 5,604,921 A | 2/1997 | Alanara |
| 5,615,110 A | 3/1997 | Wong |
| 5,642,485 A | 6/1997 | Deaton et al. |
| 5,708,422 A | 1/1998 | Blonder et al. |
| 5,774,882 A | 6/1998 | Keen et al. |
| 5,852,775 A | 12/1998 | Hidary |

(Continued)

FOREIGN PATENT DOCUMENTS

| | | |
|---|---|---|
| AU | 2005279689 | 3/2006 |
| KR | 10-2005-0095267 A | 9/2005 |

OTHER PUBLICATIONS

Elham Rannezani, Mobile Payment, Jun. 2008, E-Business Technology, web, 1-18 (Year: 2008).*

(Continued)

*Primary Examiner* — I Jung Liu
(74) *Attorney, Agent, or Firm* — Kilpatrick Townsend & Stockton LLP

(57) ABSTRACT

Embodiments of the present invention are directed to a system and method for determining the products involved in a transaction conducted with a subsidiary user of a payment account, and transmitting messages containing product specific information. Systems may be implemented to transmit product identifiers during payment processing. The product specific information may be included in alert messages sent to an account holder.

20 Claims, 8 Drawing Sheets

(56) References Cited

U.S. PATENT DOCUMENTS

| | | | |
|---|---|---|---|
| 5,878,337 A | 3/1999 | Joao et al. | |
| 5,903,830 A | 5/1999 | Joao et al. | |
| 6,012,144 A | 1/2000 | Pickett | |
| 6,049,778 A | 4/2000 | Walker et al. | |
| 6,055,570 A | 4/2000 | Nielsen | |
| 6,064,990 A | 5/2000 | Goldsmith | |
| 6,067,529 A * | 5/2000 | Ray et al. | 705/24 |
| 6,185,200 B1 | 2/2001 | Prasad | |
| 6,185,290 B1 | 2/2001 | Shaffer et al. | |
| 6,185,541 B1 | 2/2001 | Scroggie et al. | |
| 6,292,786 B1 | 9/2001 | Deaton et al. | |
| 6,311,169 B2 | 10/2001 | Duhon | |
| 6,330,550 B1 | 12/2001 | Brisebois et al. | |
| 6,353,398 B1 | 3/2002 | Amin | |
| 6,381,324 B1 | 4/2002 | Shaffer et al. | |
| 6,418,436 B1 | 7/2002 | Degen et al. | |
| 6,424,951 B1 | 7/2002 | Shurling et al. | |
| 6,442,532 B1 | 8/2002 | Kawan | |
| 6,484,148 B1 | 11/2002 | Boyd | |
| 6,505,046 B1 | 1/2003 | Baker | |
| 6,529,725 B1 | 3/2003 | Joao et al. | |
| 6,535,855 B1 | 3/2003 | Cahill et al. | |
| 6,553,100 B1 | 4/2003 | Chen et al. | |
| 6,608,556 B2 | 8/2003 | De Moerloose et al. | |
| 6,612,488 B2 | 9/2003 | Suzuki | |
| 6,636,587 B1 | 10/2003 | Nagai et al. | |
| 6,647,269 B2 | 11/2003 | Hendrey et al. | |
| 6,684,195 B1 | 1/2004 | Deaton et al. | |
| 6,741,188 B1 | 5/2004 | Miller et al. | |
| 6,775,539 B2 | 8/2004 | Deshpande | |
| 6,842,774 B1 | 1/2005 | Piccioni | |
| 6,859,451 B1 | 2/2005 | Pasternack | |
| 6,873,972 B1 | 3/2005 | Marcial et al. | |
| 6,879,838 B2 | 4/2005 | Rankin | |
| 6,891,911 B2 | 5/2005 | Rostoker et al. | |
| 6,912,398 B1 | 6/2005 | Domnitz | |
| 6,913,194 B2 | 7/2005 | Suzuki | |
| 6,970,850 B1 | 11/2005 | Freeny, Jr. | |
| 6,993,326 B2 | 1/2006 | Link, II et al. | |
| 7,003,497 B2 | 2/2006 | Maes | |
| 7,024,211 B1 | 4/2006 | Martin | |
| 7,024,396 B2 | 4/2006 | Woodward | |
| 7,027,801 B1 | 4/2006 | Hall et al. | |
| 7,028,052 B2 | 4/2006 | Chapman et al. | |
| 7,092,724 B2 | 8/2006 | Fellenstein et al. | |
| 7,096,003 B2 | 8/2006 | Joao et al. | |
| 7,100,049 B2 | 8/2006 | Gasparini et al. | |
| 7,167,830 B2 | 1/2007 | Sravanapudi et al. | |
| 7,203,300 B2 | 4/2007 | Shaffer et al. | |
| 7,310,534 B2 | 12/2007 | Northcutt | |
| 7,337,119 B1 | 2/2008 | Geschwender et al. | |
| 7,343,149 B2 | 3/2008 | Benco | |
| 7,355,990 B2 | 4/2008 | Smith | |
| 7,356,506 B2 | 4/2008 | Watson | |
| 7,357,310 B2 | 4/2008 | Calabrese et al. | |
| 7,376,431 B2 | 5/2008 | Niedermeyer | |
| 7,418,086 B2 | 8/2008 | Sravanapudi et al. | |
| 7,600,676 B1 * | 10/2009 | Rados et al. | 235/380 |
| 2001/0011245 A1 | 8/2001 | Duhon | |
| 2001/0029485 A1 | 10/2001 | Brody et al. | |
| 2002/0077964 A1 | 6/2002 | Brody et al. | |
| 2002/0087460 A1 | 7/2002 | Hornung | |
| 2002/0116322 A1 | 8/2002 | Schnall | |
| 2002/0133462 A1 | 9/2002 | Shteyn | |
| 2003/0061111 A1 | 3/2003 | Dutta et al. | |
| 2003/0061163 A1 | 3/2003 | Durfield | |
| 2003/0105707 A1 | 6/2003 | Audebert | |
| 2003/0182191 A1 | 9/2003 | Oliver | |
| 2004/0039683 A1 | 2/2004 | McGeorge | |
| 2004/0064401 A1 | 4/2004 | Palaghita | |
| 2004/0078340 A1 | 4/2004 | Evans | |
| 2004/0103049 A1 | 5/2004 | Kerr | |
| 2004/0143527 A1 | 7/2004 | Benkert et al. | |
| 2004/0199470 A1 * | 10/2004 | Ferry, Jr. | G06Q 20/20 705/39 |
| 2005/0154665 A1 | 7/2005 | Kerr | |
| 2005/0170814 A1 | 8/2005 | Joao et al. | |
| 2005/0199775 A1 | 9/2005 | Kaminski et al. | |
| 2006/0059110 A1 | 3/2006 | Madhok | |
| 2006/0089905 A1 | 4/2006 | Song et al. | |
| 2006/0200396 A1 | 9/2006 | Satterfield et al. | |
| 2006/0202025 A1 | 9/2006 | Calabrese et al. | |
| 2006/0277142 A1 | 12/2006 | McGeorge | |
| 2006/0281439 A1 | 12/2006 | Benco et al. | |
| 2007/0006286 A1 | 1/2007 | Singhal | |
| 2007/0119921 A1 * | 5/2007 | Hogg et al. | 235/380 |
| 2008/0004950 A1 | 1/2008 | Huang et al. | |
| 2008/0147484 A1 | 6/2008 | Davis | |
| 2008/0156869 A1 | 7/2008 | Carr et al. | |
| 2008/0161058 A1 * | 7/2008 | Park et al. | 455/564 |
| 2008/0182590 A1 | 7/2008 | Ruckart et al. | |
| 2008/0200144 A1 | 8/2008 | Ginsberg | |
| 2008/0210753 A1 * | 9/2008 | Plozay | G06Q 40/02 705/14.27 |
| 2008/0288385 A1 | 11/2008 | Geschwender et al. | |
| 2008/0294556 A1 | 11/2008 | Anderson | |
| 2009/0106846 A1 | 4/2009 | Dupray et al. | |

OTHER PUBLICATIONS

Wolf, Jim; "New Web Service Warns of Identity Theft;" www.greensgun.com/bboard/q-and-a-fetch-msg.tcl?msg_id=003yBJ; Oct. 23, 2000; printed May 4, 2011; 2 pages.

AU Patent Application No. 2010245109, Patent Examination Report No. 1 dated Nov. 20, 2012, 3 pages.

* cited by examiner

SKU LEVEL CONTROL AND ALERTS

CROSS-REFERENCES TO RELATED APPLICATIONS

This patent application is a non-provisional of and claims priority to U.S. provisional patent application No. 61/173,371, filed on Apr. 28, 2009, which is herein incorporated by reference in its entirety for all purposes.

BACKGROUND

Transaction alert messages can be used to notify consumers that transactions have been conducted with their payment cards. For example, a person may receive an alert message regarding a recent transaction conducted at a gardening store. The alert message may contain transaction data such as the total amount of the transaction, the time the transaction occurred, and the name of the merchant.

The alert message may be sent to the person's mobile phone so that the person is notified that a transaction occurred. However, such messages may be limited by the data transmitted during the transaction. For example, the person may receive a message that the transaction was for forty-five dollars worth of goods at the gardening store, but she may not receive any indication of what, exactly, that money purchased. As such, the message may only give the transaction total, but not itemize the products or provide other product specific information. The person may not have a way to determine what, exactly, was purchased.

Such alert messages could be improved. Embodiments of the present invention address these problems and other problems individually and collectively.

BRIEF SUMMARY

Embodiments of the present invention disclosed herein include systems and methods for sending product control alert messages. The alert systems can be implemented using one or more computer apparatuses and databases.

In exemplary embodiments, the product control alert messages may include information specific to the products purchased by a first consumer, and may be sent to a second consumer. Such specific information may include the names of the products, loyalty information based upon the products, etc.

One embodiment of the invention is directed to a method comprising receiving transaction data for a transaction conducted with a first user, the transaction data including a product identifier (such as a SKU or UPC) for a product. The method further comprises accessing a database including product control data associated with the product identifier, the product control data including a product name identified by the product identifier, generating, using a computer server, a product control alert indicator, the product control alert indicator including the product name, and sending a product control alert message to a user device of an account holder associated with the payment account, the product control alert message including the product control alert indicator, wherein the account holder is a second user different from the first user.

Another embodiment of the invention is directed to a method of enrolling in an alerts program and receiving messages. The method comprises enrolling a payment account with a notification service, registering a list of products requiring notification, and receiving a product control alert message at a user device of a second user, wherein the product control alert message includes a product control alert indicator for a purchased product, after the payment account has been used by a first user to conduct a purchase transaction for the product.

Another embodiment of the invention is directed to a system comprising a database, the database comprising product control data associated with product identifiers for products. The system further comprises a server computer coupled to the database, wherein the server computer comprises a processor and a computer-readable medium coupled to the processor, the computer-readable medium comprising code executable by the processor for implementing a method. The method comprises receiving transaction data for a transaction conducted with a first user, the transaction data including a product identifier for a product, accessing a database including product control data associated with the product identifier, the product control data including a product name identified by the product identifier, generating, using a computer server, a product control alert indicator, the product control alert indicator including the product name, and sending a product control alert message to a user device of an account holder associated with the payment account, the product control alert message including the product control alert indicator, wherein the account holder is a second user different from the first user.

BRIEF DESCRIPTION OF THE DRAWINGS

These and other embodiments of the invention are described in further detail below.

DETAILED DESCRIPTION

One embodiment of the invention is directed to a method for sending an alert message to a notification device operated by a second person regarding a transaction for one or more products. The transaction may have been conducted with a first person, using a payment card (or other type of portable consumer device). The alert message may include line item product data. Such line item data may comprise detailed information broken out by the individual products purchased (i.e., not aggregated by total purchase as in conventional systems). This information may be based upon a product identifier, such as a Stock Keeping Unit ("SKU") number or a Universal Product Code ("UPC").

Illustratively, a first person such as a teenage son in a household may purchase an item at a merchant using a payment card, and a first product control alert message (such as a general alert message) may be sent to the son's mobile phone. A first product control alert message may contain transaction control data including the amount of the transaction, a list of the products purchased, the merchant's name, and an identifier for the payment card. In addition to the first product control alert message, a second product control alert message may be sent to a mobile phone operated by the son's father (i.e., the second person). In addition to the transaction control data included in the first product control alert message, the contact alert message may also contain an identification of who conducted the purchase (i.e., the first person). The identification may comprise the credit card number (or a portion thereof) used by the son, the son's phone number, or other contact information. Consequently, when the son conducts the transaction, the father is notified as to what products the son is purchasing substantially contemporaneously (e.g., within 5 or 1 minute or less) with the son's purchase. If the father wants to contact the son, the father can simply touch the phone number in the second product control alert message.

The second person may want to know what products the first person is purchasing for a variety of reasons. In the example above, the father may want to contact the son to ask the son why he is conducting the transaction. The father may alternatively want to ask his son to purchase another item (such as a complementary product) at that same merchant, or at another merchant nearby.

I. Systems

Figure 1:
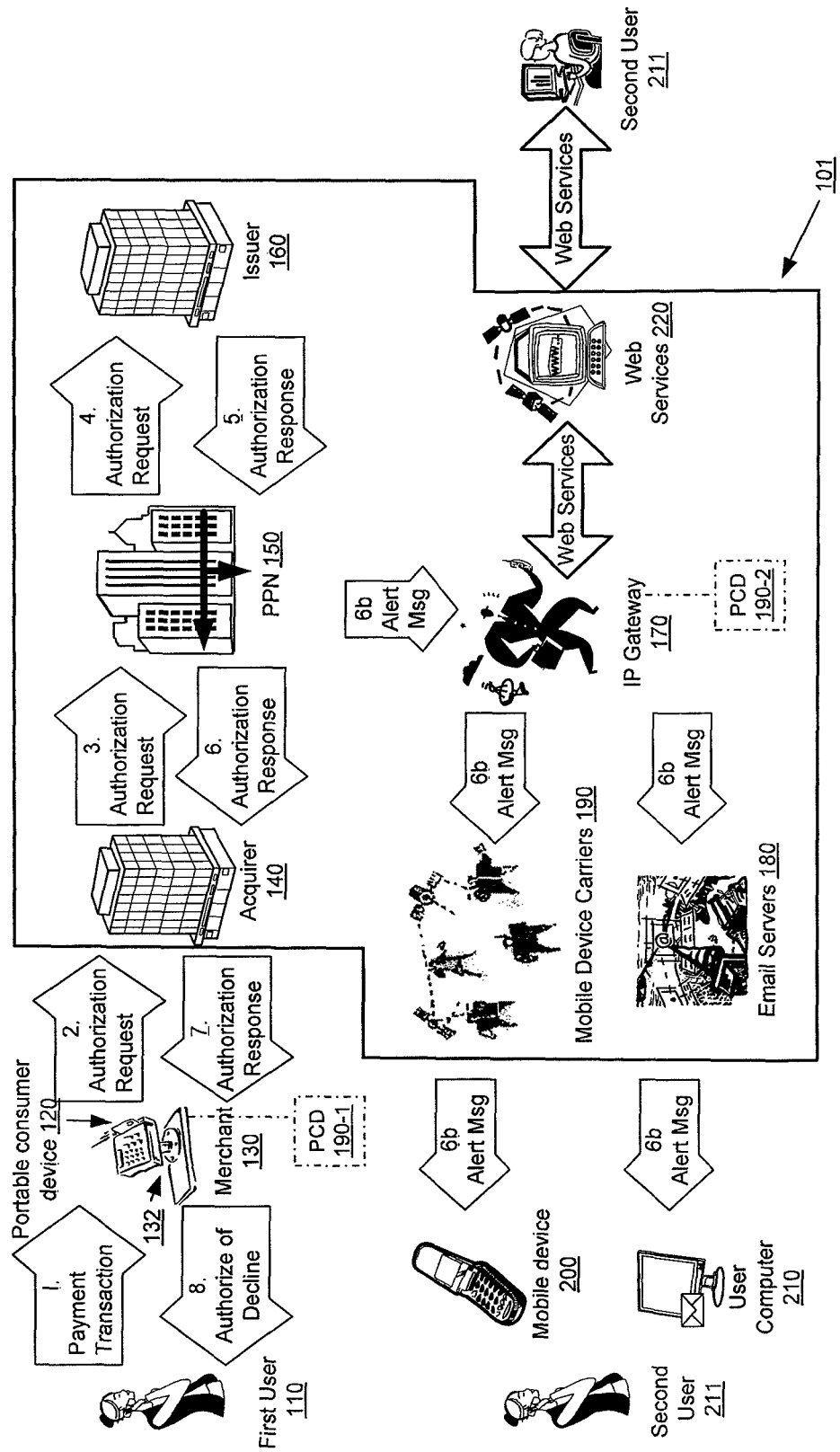
FIG. 1 shows a diagram of an alert system.

FIG. 1 is a diagram illustrating an alert system 100, in accordance with an embodiment of the invention. The alert system 100 includes a first user 110, a second user 211, a portable consumer device 120, a merchant 130, an access device 132, an acquirer 140, a payment processing network 150, an issuer 160, an IP gateway 170, mobile device carriers 185, e-mail servers 180, a mobile device 200, a user computer 210, and Web services 220. The mobile device 200 and the user computer 210 are examples of user devices (e.g. notification devices). Further descriptions of notification devices and portable consumer devices are provided below.

The user 110 can be a consumer that uses the portable consumer device 120 to conduct a transaction, and may further operate one or more user devices, including the mobile device 200 which may comprise a mobile phone. The mobile device 200 operated by the user 110 may receive a product control alert message after the user 110 conducts a transaction using her portable consumer device 120. The product control alert message may contain information relating to the product identifier(s) for the products just purchased in the transaction. In one embodiment, the IP gateway 170 may store various product identifiers and related information in a database. The IP gateway 170 may store the product identifiers and other product, user, or merchant information in a product control database 190-2. When creating the product control alert message, the IP gateway 170 can include this product information, such that the user 110 can receive targeted information specific to the products purchased. In another embodiment, the product identifiers and other information may be stored outside the IP gateway 170, such as in product control database 190-1 which can be located at or near the merchant 130. The product control database 190-1 may be directly connected to nearby notification servers to generate and send product control alert messages. The product control databases 190-1, 190-2 in FIG. 1 are shown with dashed lines, to indicate the database can be placed in either or both locations, depending on the embodiment.

The merchant 130 has an access device 132 for interacting with the portable consumer device 120, and the acquirer 140 is associated with the merchant 130. The acquirer 140 is in communication with the issuer 160 through the payment processing network 150.

The alert system 100 also includes an IP gateway 170 that is in communication with payment processing network 150.

IP gateway 170 receives the transaction data from the payment processing network 150 and can generate alert messages. IP gateway 170 is also in communication with the mobile device carriers 185, e-mail servers 180, and Web services 220. The mobile device carriers 185 are in operative communication with the mobile device 200, and the mail servers 180 are in operative communication with the user computer 210. The alert messages that are generated from IP gateway 170 are sent to the mobile device carriers 185 and/or mail servers 180 to be sent to the user device (i.e., mobile device 200, and/or the user computer 210).

The web services 220 may be in operative communication with the second user 211 for enrolling the first user 110 and the second user 211 in the product control alert messaging service provided by the alert system 100. The web services 220 may also be in communication with a merchant 130 for enrolling the merchant 130 in the product control alert messaging service provided by the alert system 100.

The first user 110 and the second user 211 may each be a person (i.e., an individual) such as a consumer, or an organization such as a business that is capable of purchasing goods or services or conducting any suitable transaction with the merchant 130. In exemplary embodiments of the invention, the first user 110 and the second user 211 are different from each other (i.e., not the same person).

The merchant 130 may refer to any suitable entity or entities that can conduct a transaction with the first user 110 and/or the second user 211. The merchant 130 may have a physical location which sells goods and services to the first user 110 or the second user 211. For example, the merchant 130 may use an e-commerce business to allow the transaction to be conducted with the merchant 130 through the Internet. Other examples of a merchant 130 include a department store, a gas station, a drug store, a grocery store, or other suitable business.

The access device 132 may be any suitable device for communicating with the merchant 130 and for interacting with the portable consumer device 120. The access device 132 can be in any suitable location such as at the same location as the merchant 130. The access device 132 may be in any suitable form. Some examples of access devices 132 include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. The access device 132 may use any suitable contact or contactless mode of operation to send or receive data from the portable consumer devices 120.

If the access device 132 is a POS terminal, any suitable POS terminal may be used and may include a reader, a processor, and a computer-readable medium. Reader may include any suitable contact or contactless mode of operation. For example, exemplary card readers can include radio frequency (RF) antennas, optical scanners, bar code readers, magnetic stripe readers, etc. to interact with portable consumer device 120.

The acquirer 140 refers to any suitable entity that has an account with the merchant 130. In some embodiments, the issuer 160 may also be the acquirer 140.

The payment processing network 150 refers to a network of suitable entities that have information related to an account associated with the portable consumer device 120. This information includes data associated with the account on the portable consumer device 120 such as profile information, data, and other suitable information.

The payment processing network 150 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. The server computer may use any of a variety of computing structures, arrangements, and compilations for servicing the requests from one or more client computers.

The payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 150 may use any suitable wired or wireless network, including the Internet.

The issuer 160 refers to any suitable entity that may open and maintain an account associated with the portable consumer device 120 used by the first user 110 and/or the second user 211. Some examples of issuers may be a bank, a business entity such as a retail store, or a governmental entity.

The account associated with the portable consumer device 120 may comprise a user account, which can be a payment account such as a credit card account. The second user 211 may comprise the "account holder," and may be the primary user in charge of the account. The first user 110 may comprise a subsidiary user. The subsidiary user may have access to the payment account for making payments, but may not receive billing statements or may otherwise have limited access to certain or all account features. In some embodiments, each subsidiary user may have their own portable consumer device, with its own payment account identifier. Each payment account identifier may be associated with the payment account of the account holder, however. Thus, any purchases conducted with the subsidiary user may be paid for from the payment account. For example, a company may have a payment account for purchasing supplies. Two employees of the company (i.e., two subsidiary users) may be authorized to use the payment account purchase supplies, and each employee may have their own portable consumer device, each with a different payment account identifier. Should either portable consumer device be used to purchase a product, the same payment account will be used to fund the transaction. However, as each portable consumer device has a unique payment account identifier, the company can easily keep track of which employee has made each purchase.

In some embodiments, the payment account may comprise one or more subsidiary accounts. Each subsidiary account may have its own subsidiary account identifier, but will still be associated with the payment account for clearing and settling purchases. Each subsidiary account may be associated with a different subsidiary user, and may have its own preferences (e.g. each subsidiary account may have a respective list of products requiring notification). For example, a parent may have a payment account, and may be the account holder. The parent may have three children. Each child may have a subsidiary account to the payment account. Each subsidiary account can have its own spending limits, and alert preferences. The first subsidiary account (for the first child) may not have a list of products requiring notification (i.e., the first child is authorized to purchase anything without an alert being sent). The second subsidiary account (for the second child) may have a list of prohibited products comprising any alcohol or any products containing alcohol. This list may include the product identifiers of such products, and the parent may receive a product control alert message should the second child purchase an alcohol containing product. The third subsidiary account (for the third child) may have a list of prohibited products comprising tobacco or alcohol. Thus, the third prohibited product list may include the product identifiers for tobacco and alcohol products, and the parent may receive a product control alert message should the third child purchase any of these products.

The IP gateway 170 refers to an entity that generates and delivers notifications and contact alert messages to various delivery channels. The IP gateway 170 may include one or more servers and databases for generation of the contact alert messages and retrieval of data. The IP gateway 170 may be part of the payment processing network 150 or may be a separate entity in communication with the payment processing network 150.

The e-mail servers 180 are server computers configured to receive an e-mail from a network connection and store the e-mail in memory for future retrieval.

The mobile device carriers 185 refer to entities that provide wireless infrastructures for wireless data transfer and communication via cellular phone or other mobile devices. Example of such entities are AT&T™, Verizon Wireless™, T-Mobile™, etc.

The mobile device 200 may be in any suitable form. For example, a suitable mobile device 200 can be hand-held and compact so that it can fit into a consumer's wallet and/or pocket (e.g., pocket-sized). Some examples of a mobile device 200 include desktop, tablet, or laptop computers, mobile (e.g. cellular) phones, personal digital assistants (PDAs), pagers, payment cards, security cards, access cards, smart media, transponders, and the like. In some embodiments, the mobile device 200 and the portable consumer device 120 are embodied in the same device. In some embodiments, the mobile device 200 (or other user device) may comprise a processor, and a computer readable medium coupled to the processor. The computer readable medium comprises code, executable by the processor, for implementing a method comprising: receiving a product control alert message at a user device of a second user, wherein the product control alert message includes a product control alert indicator for a purchased product, after the payment account has been used by a first user to conduct a purchase transaction for the product The user computer 210 may be a personal computer or a laptop. The User computer 210 may run an operating system such as Microsoft Windows™ and may have a suitable browser such as Internet Explorer™.

The web services 220 may be in the form of a server and a Website which allows users and merchants to enroll in the product control alert messaging service. Web services 220 may be provided by the issuer 160 or the payment processing network 150.

Figure 2:
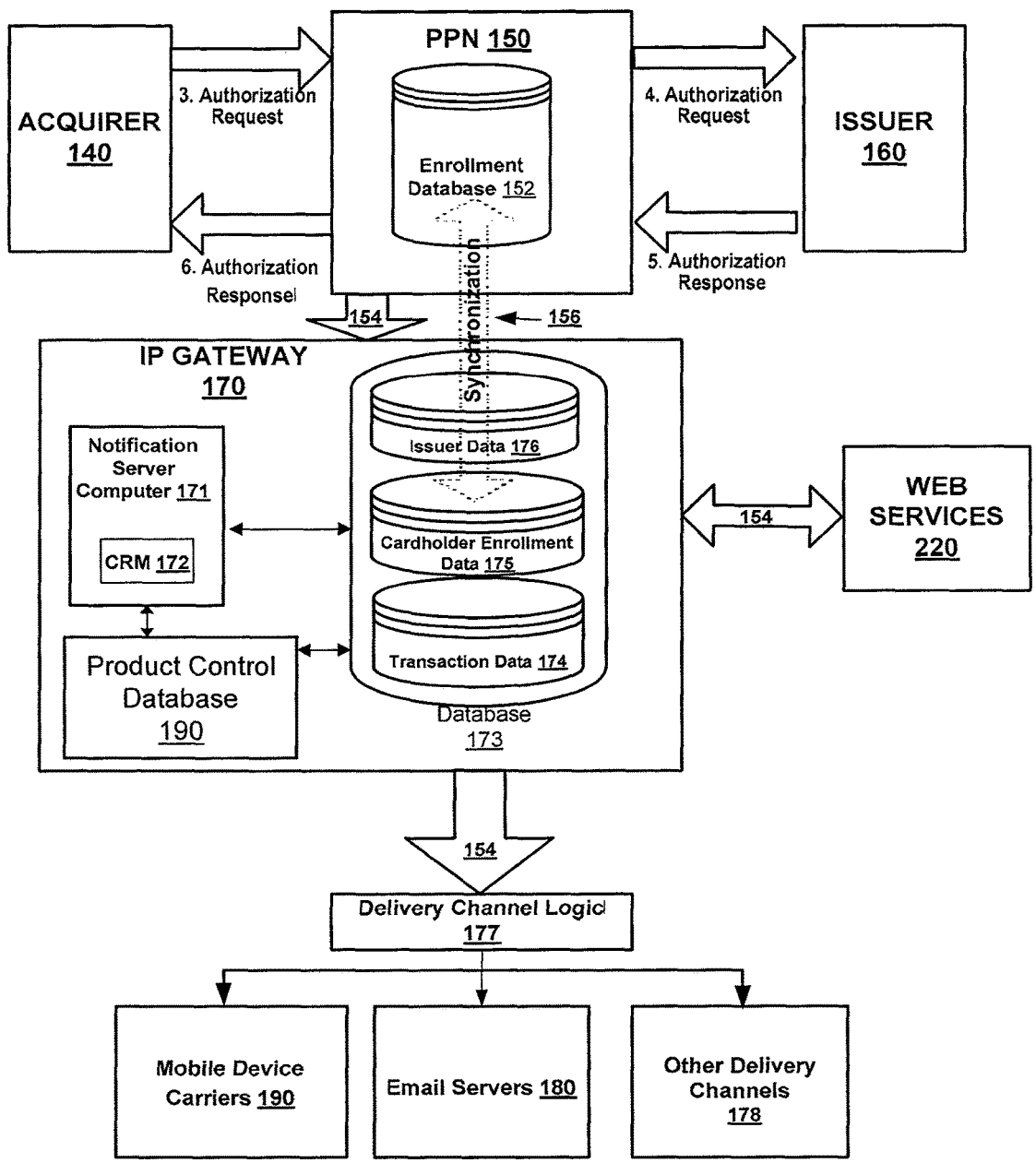
FIG. 2 shows a portion of the alert system in FIG. 1.

FIG. 2 is a diagram illustrating a subsystem 101 of the alert system 100. FIG. 2 illustrates more details about the IP gateway 170. The IP gateway 170 includes a notification server computer 171. The notification server computer 171 comprises a processor and a computer-readable medium 172 coupled to the processor (not shown). The computer readable medium can comprise code executable by the processor for implementing methods disclosed herein, including receiving transaction data for a transaction conducted with a first user, the transaction data including a product identifier for a product, accessing a database including product control data associated with the product identifier, the product control data including a product name identified by the product identifier, generating, using a computer server, a product control alert indicator, the product control alert indicator including the product name, and sending a product control alert message to a user device of an account holder associated with the payment account, the product control alert message including the product control alert indicator, wherein the account holder is a second user different from the first user.

The notification server computer 171 is in communication with a database 173. In some embodiments, database 173 may be included in the notification server computer 171. Database 173 contains transaction data 174, issuer data 176, and cardholder enrollment data 175 (which may include alert preference data). Cardholder enrollment data 175 (e.g., information related to users and accounts enrolled in the product control alert messaging service) may be synchronized with the enrollment database 152 in the payment processing network 150 via the synchronization link 156. The enrollment database 152 can contain data related to users who are enrolled in the product control alert messaging service. As shown in FIG. 2, IP gateway 170 is in communication with payment processing network 150, and Web services 220 via the network connection 154 which may be in any suitable form. The network connection 154 may include, for example, at least a portion of the Internet. Delivery channel logic 182 can be in communication with IP gateway 170, and any or all of mobile service carriers 185, e-mail servers 180, and other delivery channels 178.

The notification server computer 171 can also be in communication with a product control database 190. In some embodiments, the product control database 190 can be a stand alone database (and may include hardware such as a hard drive and a controller such as a processor, not shown). In other embodiments, portions or all of the product control database 190 can be included in the notification server computer 171, or in the database 173. The product control database 190 includes data regarding product identifiers, such as a listing of product identifiers cross indexed to products requiring notification and other information. For instance, when a first user 110 purchases lottery tickets, the payment processing network may forward the product identifier for the lottery tickets to the IP gateway 170. The notification server computer 171 can use the product identifier to look up (i.e., determine) the product control data in the product control database 190. The product control database 190 may indicate that lottery tickets are listed as prohibited purchases for the first user 110. The IP gateway 170 can then prepare an alert message to the second user 211, to alert her to the purchase.

In certain embodiments, the product control database 190 and/or the notification server computer 171 can be located within the IP gateway 170, and allow for centralized processing. In these embodiments, the merchant 130 can send the IP gateway 170 the product identifier, after which the alert may be processed and generated entirely by the IP gateway 170 or other centralized systems.

In other embodiments, all or portions of the IP gateway 170 and/or the product control database 190 may be located at the "edge" of the payment processing network 150 (e.g., locally, such as at, or close to, the merchant 130). U.S. patent application Ser. No. 11/171,516, filed Jun. 29, 2005, describes embodiments of systems located at the edge of a network, and is incorporated herein for all purposes. FIG. 1 shows embodiments where the product control database (and portions, or all, of the notification server computer 171) can be located at the network edge (190-1) or centrally (190-2). The product control databases 190-1, 190-2 in FIG. 1 are shown with dashed lines, to indicate the database can be placed in either or both locations, depending on the embodiment.

In certain embodiments, the product control data may be determined and the alert message may be generated locally, by the edge system comprising product control database 190-1. In other embodiments, the alert message may be generated by a combination of edge and central processing. For example, edge systems comprising the product control database 190-1 may create an alias of the product identifier, and may send to the alias to the IP gateway 170 during the transaction. In another example, the edge systems may determine product control data for the product purchased in the transaction. The edge systems may then send the product control data to the IP gateway 170 during the transaction (and thus may not need to send the product identifier). Such processing will be disclosed in greater detail below.

Figure 3:
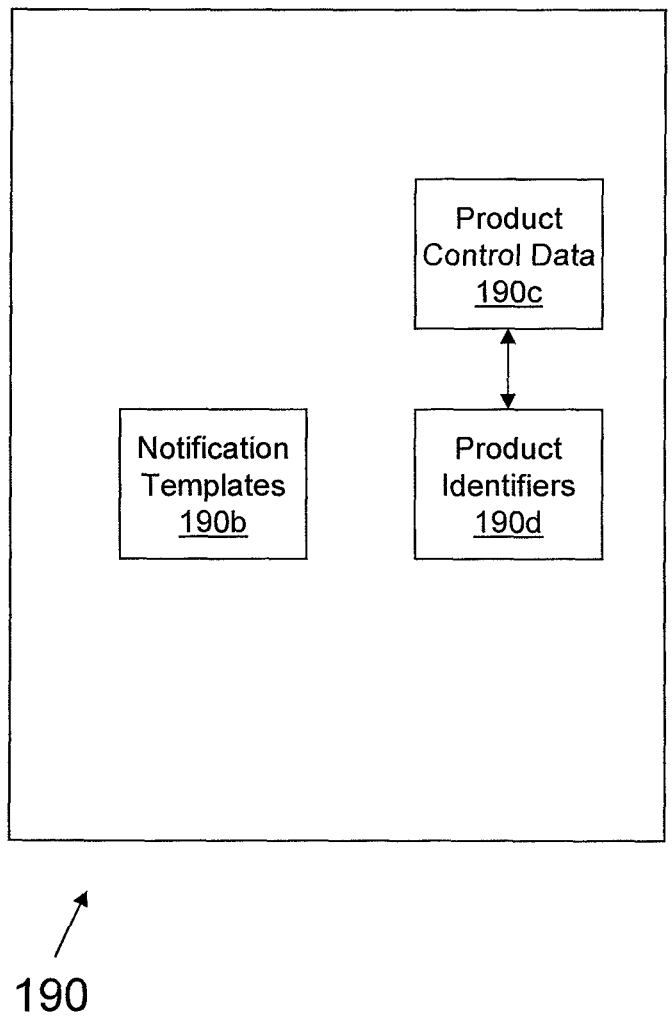
FIG. 3 shows a portion of a database of the alert system of FIG. 1.

Referring to FIG. 3, an implementation of the product control database 190 can contain notification templates 190b, product control data 190c, and product identifiers 190d. The product control database 190 may contain other data, more data stores, or fewer data stores, in other implementations. In the implementation shown in FIG. 3, the product control database maintains a registry of product identifiers (product identifiers 190d) that is indexed to a database of product control data (product control data 190c). Thus, the product control database 190 can include a plurality of product identifiers and a plurality of product control data, and each product identifier can be associated with its own stored product control data. In this manner, a computer (such as the notification server computer 171) can receive a product identifier during a transaction, and easily look up the product identifier from the registry of product identifiers 190d, to determine the associated product control data. In other embodiments, the computer may receive the product identifier and a payment account number during the transaction, and may look up the payment account number in the product control data 190c, to determine which product identifiers are registered with the account as requiring notification. Methods of using the product control database 190 will be described in greater detail below.

Product control data 190c may include information about a specific product or product line, and information about payment account settings. In an embodiment of the invention, the product control data 190c may be synchronized with the cardholder enrollment data 175, so that the product control database 190 may include alert preferences and account information. This information may be used in generating product control alert messages, as described herein. In certain implementations, the product control data 190c can include a list of account identifiers (e.g., a bank account number, credit card number, etc.), alert preferences, a list of product names, each product name associated with a product identifier in product identifiers 190d, a contact information for each user device associated with a given payment account, etc. In some implementations, the product control data 190c may include a list of products requiring notification (e.g., a list of product identifiers). This list of products requiring notification may comprise, for instance, a list of prohibited product identifiers. The product identifiers purchased in a transaction may be checked against this list. For example, a first user may purchase a product having a product identifier that is on the list of prohibited product identifiers. The transaction may be declined by the issuer 160 or payment processing network 150, due to this prohibited product. Alternatively, the transaction may be authorized. In either event, a product control alert message may be sent to the account holder, alerting the account holder to this attempted purchase of a prohibited product.

The information in product control data 190c can be used by the IP gateway 170 in FIG. 2 to easily create an indicator for alerting an account holder to a purchase of a specific product. The indicator can be sent in an alert message to the account holder (i.e., a second user 211) and may also be sent to the purchaser of the product (i.e., a first user 110). The product control data 190c may include other information about the associated product, such as other names for the product (aliases, local nicknames, etc.), loyalty program information, etc. Embodiments of the invention can allow any or all of this information to be distilled into an easy to read product control alert indicator, which can be sent to the consumer in a product control alert message.

The IP gateway 170 can locate the desired product control data 190c stored in the database 190 by cross-referencing the data with its associated product identifier or payment account identifier. The product identifiers 190d may be assigned by any suitable party (such as the merchant 130, a manufacturer, the payment processing network 150, etc.) and may be used to identify a product, product range, service, billable entity, trade item, etc. For instance, the product identifier may unique for each product, such that different products have different product identifiers, but different copies of the same product will have the same product identifier (e.g., a SKU number). In a second example, the product identifier may be a product line identifier that is assigned by the manufacturer to each product of a specific product line. In another example, the product identifier may be an individual product identifier that is specific to each individual product. Thus, two different copies of the same product may each have a different individual product identifier (such as a serial number). Other types of product identifiers may be used, such as product variant identifiers (i.e., each variant of a product model, such as different colored products, may have its own identifier), etc.

In one example, the product identifier can comprise the SKU number for a product. In this example, when a first consumer purchases one or more products, the SKU number for each product, along with the number of the payment account used by the consumer (such as a credit card number), can be correlated with their associated product control data; an alert message can then be sent to a second consumer, such as the account holder. If a consumer purchases a bottle of aspirin and bottle opener with a credit card, two SKU numbers can be sent from the store to the payment processing network 150—a first SKU number for the aspirin, and a second SKU number for the bottle opener. The product control database 190 can have a registry of SKU numbers (190d) which can be indexed to the product control data 190c. The product control database 190 can therefore be accessed to determine the product control data associated with the first and second SKU numbers. The associated product control data may include information for each product, based upon the credit card used in the transaction. For instance, the associated product control data may indicate that the credit card account is eligible for a rebate upon the purchase of a bottle opener, irrespective of the merchant. An alert message can then be generated using this portion of the product control data, to alert the account holder to the rebate. In this manner, the notification server computer 171 (or other suitable processor) can use the product identifier received during a transaction to determine a variety of useful and valuable information related to the transaction and the payment account.

The product control database 190 may further include a database of notification templates 190b. The notification templates can comprise one or more templates of product control alert indicators and product control alert messages that can be sent to the user 110. The templates 190b may contain a format for the indicator, such as "[person] purchased [product] at [store], for $[cost], on [date]. [Product] is registered as a prohibited item." The templates 190b may also include formatting for product control alert indicators. Thus, if the determined product data includes a listing of twenty products purchased stores, the notification template 190b may indicate to the server computer 171 that only the prohibited items may be the portion of the product control data included in the product control alert indicator. Once the product control alert indicator is generated, it can be included in the alert message. This allows for efficient generation and formatting of alert messages to quickly and effectively convey product information to consumers. Other suitable templates are contemplated in embodiments of the notification templates database 190b. Each template in the plurality of stored templates may be associated with one or more alerts services. Thus, when a transaction has been qualified for a specific product control alert message, the associated template may be used to generate a product control alert message, and different customers may receive different alert messages depending on the programs and services they are enrolled in.

II. Methods

A. Conducting a Transaction

Referring to FIG. 1, a method of conducting a transaction according to an embodiment of the invention, such as a payment transaction, is shown with respect to system 100. In a typical payment transaction, a first user 110 purchases goods or services at merchant 130 using the portable consumer device 120 (arrow 1). An authorization request message comprising transaction data is generated by a processor in the access device 132 after the portable consumer device 120 interacts with the access device 132. The transaction data may comprise, for example: the payment account identifier, such the BIN (bank identification number) and expiration date associated with the portable consumer device 120; the purchase amount; a transaction identifier (which can be used to reference the specific transaction); and a merchant code such as a merchant category code (MCC). The transaction data may also include the one or more product identifiers of the one or more products purchased in the transaction (or alternatively, aliases that reference the product identifiers, etc). In one embodiment, the authorization request message may comprise the XML format. In other embodiments, other formats may be used. The authorization request message is then forwarded from the merchant 130 to the acquirer 140 (arrow 2). After receiving the authorization request message, acquirer 140 then sends the authorization request message to the payment processing network 150 (arrow 3).

The payment processing network 150 then forwards the authorization request message to the issuer 160 (arrow 4). After the issuer 160 receives the authorization request message, the issuer 160 sends an authorization response message back to the payment processing network 150 to indicate whether or not the current transaction is authorized (or not authorized) (arrow 5). The payment processing network 150 can then forward the authorization response message to the acquirer 140 (arrow 6). The acquirer 140 then sends the authorization response message to merchant 130 (arrow 7), and the transaction can continue, such as having the merchant 130 provide the purchased goods or services to the first user 110 (arrow 8).

B. Sending a Product Control Alert Message

In exemplary embodiments, the one or more product identifier(s) and the payment account identifier may be sent from the merchant 130 to the payment processing network 150, as part of the authorization request message (arrows 2 and 3). If the account for the first user 110 is enrolled in the product control alert messaging service, the payment processing network 150 sends the transaction data (i.e., product identifier(s), payment account number, and other pertinent data from the authorization request message) to the IP gateway 170, which may include the product control database 190-2 (arrow 6b).

In one example, the authorization request message may include the product identifier in previously unused space (e.g., data bits) of the authorization request message. In another embodiment, the authorization request message may be increased in size to accommodate the product identifier. In some embodiments, portions of the authorization request message (such as the transaction identifier) may reference the product identifiers.

In further embodiments of the invention, a hashing algorithm may be used on all or portions of the product identifiers, to reduce the data footprint prior to sending as part of the authorization request message. In some systems, only a portion of the product identifier may be needed to determine the associated product data, so only this needed portion may be transmitted during transaction processing. In some embodiments, compression and/or encryption may be applied to the product identifiers or any other suitable portion of the message. In exemplary embodiments, the notification sever computer 171 may parse the authorization request message to determine the product identifier, which can then be used to generate the product control alert message as described herein.

In certain embodiments, the product identifiers may be sent to the payment processing network 150 separately from the authorization request message. For instance, during an online (e.g., web based) transaction, the online merchant may send a first message comprising an authorization request message, and a second message comprising the product identifiers, both to the payment processing network 150.

In order for the payment processing network 150 to determine whether the transaction used an account associated with a portable consumer device 120 that is enrolled in the product control alert messaging service, the payment processing network 150 can maintain a list of payment account identifiers (such as payment account numbers) associated with users who are enrolled in the product control alert messaging service, in the enrollment database 152. The data in the enrollment database 152 can be synchronized with the appropriate portion(s) of the cardholder enrollment data 175 (and product control database 190) via a synchronization link 156 which may be in any suitable form. For example, the synchronization link 156 may be in the form of a local area network connection or the Internet.

After the IP gateway 170 receives the transaction data from the payment processing network 150, the notification server computer 171 can begin the process of generating a product control alert message for that transaction. During this process, regular processing for transaction authorization continues as normal with the issuer 160, while at the same time the payment account identifier and the product identifiers can be inspected, and the product control data can be determined (e.g., the product names of alertable products, the user that conducted the transaction, where to send the alert message, etc.). The product control alert message is generated and is delivered (arrow 6b) in real time or near real time to the notification device operated by second user 211. Many times, the product control alert message is received by the second user 211 before the first user 110 leaves a checkout counter at the merchant 130.

In other exemplary embodiments, the product identifiers and payment account identifier may be analyzed closer to the merchant location, such as at an edge system comprising the product control database 190-1, as described above. For instance, the edge system may generate a product control alert indicator comprising information that is to be sent to the second user 211 regarding a recent transaction with the payment account controlled by the second user 211. The edge system may then generate an authorization request message that references the product control alert indicator, and send this authorization request message to a notification server computer 171. The notification server computer can then transmit the product control alert indicator for transmission to the second user 211.

In some implementations, the edge system can determine product control data, and forward portions or all of this determined product control data to the IP gateway 170 for inclusion in an alert message. In some implementations, the edge system comprising the product control database 190-1 may transform the product identifiers involved in the transaction into alias identifiers (i.e., shorter or easier to transmit numbers, such as by hashing or the use of lookup tables). The alias identifiers may be transmitted to the payment processing network as part of the transaction identification number, or other portion of the authorization request message. In other implementations, the edge system may include an edge IP gateway, which can both determine the product data and also generate and transmit the product control alert message, directly to the second user 211. In some of these implementations, the edge systems can include portions or all of the product control database 190 (as seen in FIG. 3), the systems and data of the IP gateway 170, as well as an enrollment database. In various embodiments, the edge systems may maintain synchronized copies of the centrally located systems.

Figure 4:
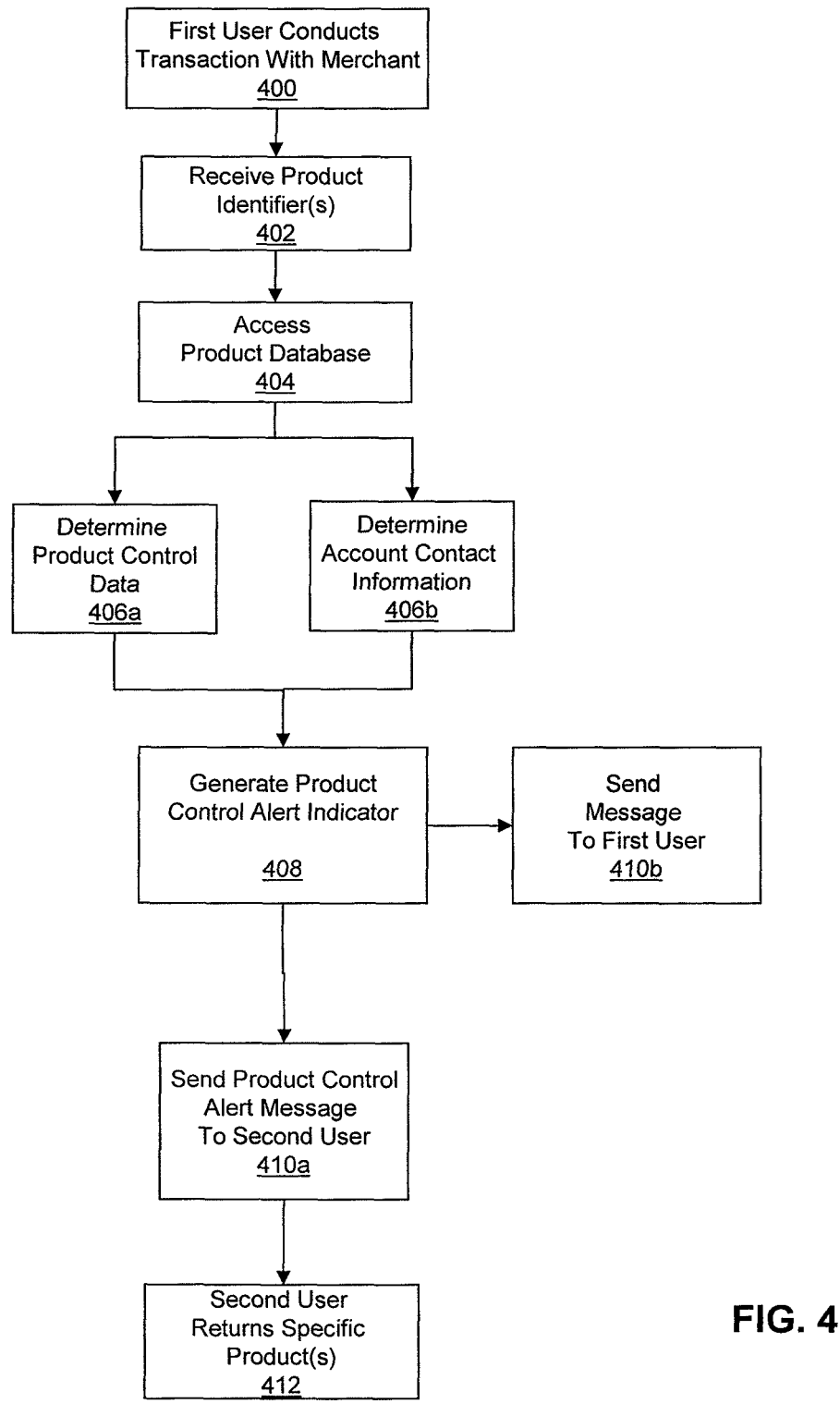
FIG. 4 shows a flowchart illustrating the steps involved when a first user conducts a transaction

FIG. 4 shows certain embodiments of methods of creating and sending product control alert messages. For instance, a consumer, such as a first user 110, may purchase a plurality of products, each with an associated product identifier, from a merchant 130. Each product has a product identifier, and a merchant price (i.e., the price a given merchant will sell the product for). In certain embodiments of the invention, each product will have only one product identifier regardless of where sold, so that each merchant (and the alert system 100) can reference the product using the same product identifier as another merchant.

The method of FIG. 4 may be performed using the product control database 190-1, the product control database 190-2, or a combination of the two. In one embodiment, the product control database 190-1 may be synchronized with the product control database 190-2. For clarity of description, the steps of the method of FIG. 4 will be explained with reference to a central product control database 190-2. However, one skilled in the art would contemplate all or some of the steps of the method of FIG. 4 being performed with the product control database 190-1 based upon the description herein.

Referring to FIG. 4, after a first user 110 uses a portable consumer device 120 to conduct a transaction (such as a purchase transaction) with a merchant 130 in step 400, the notification server computer 171 can receive the one or more product identifiers for the one or more products purchased in the transaction, along with other transaction data such as the payment account identifier of the portable consumer device 120 (step 402). Each product can have a merchant price charged by the merchant. In step 402, the received plurality of product identifiers, along with the other transaction data, can be sent in the transaction authorization request message to the notification server computer 171. For example, the consumer may have purchased two products from the first merchant—a shirt and a bottle of vodka. The first merchant price for the shirt may be $15, and the first merchant price for the bottle of vodka may be $65. The notification server computer 171 can receive a transaction authorization request message that includes the $15 and $65 prices of the shirt and vodka, respectively, as well as a first product identifier for the shirt and a second product identifier for the bottle of vodka. Prior to the transaction, the account holder (i.e., second user 211) may have enrolled the payment account with the notification service, and registered a list of products requiring notification. The notification server computer can access the product control database 190, to determine if any of the purchased products are on the list, in the steps described below.

In step 404, the notification server computer 171 can access the product control database 190. Such accessing may comprise the step of sending a message to the database to start communication, or may comprise the initial string of a search command. In other embodiments, step 404 may comprise accessing a remotely located product control database 190, and can include identifying the database location, validating access and security information, etc. The notification server computer 171 can then use the payment account identifier and one or more received product identifiers to determine the pertinent data, for use in a product control alert message, in steps 406a-b. In exemplary implementations, the notification server computer 171 can look up each received product identifier in the product identifier registry 190d. Each identifier in the registry can be correlated with its associated product control data 190c.

In step 406a, the notification server computer 171 can then determine the product control data associated with the one or more products purchased in the transaction, such as by determining which product control data 190c is associated with the payment account and the received product identifiers for the transaction. In exemplary embodiments of the invention, the determined product data can comprise "transaction product control data" (i.e., the product control data for the payment account that is associated with the product identifiers of the products involved in the transaction). In one embodiment, the notification server computer 171 can determine the transaction product control data by determining what portion of the product control data 190c is correlated to the received product identifiers. In another embodiment of the invention, the notification server computer 171 can determine the transaction product control data by determining what portion of the product control data 190c is correlated to both the received product identifiers and the received payment account identifier.

The transaction product control data may comprise lists of products requiring notification for the payment account. The lists may include lists of prohibited products, where the account holder desires to be alerted to the purchase of any prohibited product by a subsidiary user. In the above example, the transaction product data may include a list of prohibited products for the payment account associated with portable consumer device 120. This list may include the bottle of vodka purchased in the transaction. Thus, from the product control data 190c, the notification server computer 171 can determine that two products were purchased, and one of the purchased products (the vodka bottle) requires an alert message to be generated. This portion of the transaction product data can be included in the product control alert indicator that is sent to the first or second users (110, 211).

The transaction product control data may also include loyalty program data for the purchased products. Consumers may be eligible for one or more loyalty programs, based upon the products involved in the transaction. In some embodiments of the invention, the loyalty programs may be tied to the products purchased, and not be related to the merchant 130. Thus, the reward can be cross-referenced to a manufacturer, issuer, or other entity. In a first implementation, a loyalty program may be sponsored by a manufacturer, and purchasing a selectable (e.g., 5, 10, etc.) number of the manufacturer's products results in a reward. For instance, after a consumer purchases 12 shirts produced by a manufacturer, the manufacturer may send the consumer a coupon worth 20% of her next shirt purchase. In a second implementation, a loyalty program may be sponsored by another entity, such as the issuer. For instance, after a consumer purchases 10 different items of electronics using a given portable consumer device, the issuer may give the consumer a twenty-five dollar credit on the payment account billing statement. In step 406a, the notification server computer 171 can read the product control data to determine if there is relevant loyalty program data, and include such data in the product control alert indicator.

In step 406b, the notification server computer 171 can determine the payment account contact information. The payment account contact information may be stored in the product control data 190c, in the enrollment data 175, or in other suitable location. For example, the product control data 190 may include a contact information for each user device associated with a payment account. The payment account contact information can include information specifying where the product control alert messages should be sent, and how to facilitate communication among users. This payment account contact information can vary depending on the alert preferences specified by the second user 211, the products purchased, and which subsidiary user conducted the transaction. For example, the second user 211 may specify that for a first subsidiary user (e.g., a child), and for certain products (e.g., alcohol, tobacco, and firearms) product control alert messages will be sent to the mobile device 200 of the second user 211. The second user 211 may also specify that for a second subsidiary user (e.g., a spouse), and for certain products (e.g., items of electronics costing over $500.00) product control alert messages will be sent by email to a user computer 210.

After determining the transaction product control data (including the product names, whether any products require notification, and loyalty program data), and the payment account contact information, the notification server computer 171 can generate a product control alert indicator in step 408. The notification server computer 171 can select all or portions of the transaction product control data for use in the product control alert indicator. For the purchase of the shirt and bottle of vodka described above, the notification server computer 171 can determine transaction product control data comprising: the bottle of vodka is registered on a list of prohibited products for the payment account, and the purchase of the shirt accrues loyalty points under a loyalty program.

The selected data can then be formatted into a product control alert indicator. In exemplary embodiments of the invention, the product control alert indicator is information sent to the second user 211 in the product control alert message. In certain embodiments, the product control alert indicator may also be sent to the first user 110. In other embodiments, the first user 110 may receive a second product control alert indicator, different than the product control alert indicator sent to the second user 211. Thus, the notification server computer may generate two or more product control alert indicators, using the transaction product control data, in step 408.

The product control alert indicator may include the selected product control data along with formatting provided by the proper notification template. The notification server computer 171 may select the proper notification template from the database of notification templates 190*b*. The selection criteria for the proper template may depend on any or all of the selected product data (e.g., number of products to list, whether or not there is loyalty data, which user to send the message to, etc.), the rules of the product control alert messaging service that the user 110 is enrolled in, and the alert preferences chosen by the user.

Once the proper notification template is selected, the template can be filled in with the appropriate data to generate the product control alert indicator in step 408. In one example, regarding the shirt and vodka transaction described above, the notification server computer 171 may use two separate product control alert templates, for two separate product control alert indicators (i.e., one indicator per product). These two indicators may be sent in the same product control alert message, or in two separate messages. In another example, a single template may be used and the generated product control alert indicator can include data on both the first product and the second product.

In certain embodiments of the invention, the product control alert indicator contains the name of the first user 110 who conducted the transaction 400, and/or a contact information of the first user 110. The contact information may be in the form of a phone number or other address (e-mail address), which may be immediately selectable by the second user 211. When the second user 211 selects the contact information, the device that is displaying the contact information may automatically call the first user 110 that is associated with the contact information and that is conducting the present transaction.

For example, the first template may comprise "[First user] purchased a prohibited [product] at [store1], for $[cost], on [date]." The second template may comprise "[First user] purchased [product] at [store1], for $[cost], on [date]. You have earned [loyalty points] towards a [reward] under [loyalty program]." These templates may be filled in with the selected data described above, to generate a first and a second product control alert indicator, respectively. Thus, the first product control alert indicator may comprise "Your son, Mike, purchased a prohibited bottle of vodka at Quik-Convience Mart, for $65, on Nov. 15, 11 am." The second product control alert indicator may comprise "Your son, Mike, purchased a shirt at Quik-Convience Mart, for $15, on Nov. 15, 11 am. You have earned 15 points towards a 5 dollar off coupon, under Shirtco's FreeShirts Rewards Program."

The notification server computer 171 may also access other resources to further enhance the product control alert messages. These resources may be in the form of translation tables or reference tables for abbreviations and symbols. Such resources may be part of the product control database 190, be stored in notification server computer 171, or be stored in a remote location. In some embodiments, the product control alert messages are translated into a language spoken by a user. For example, during the enrollment process, the second user 211 may be provided with the option of receiving the contact alert messages in her native language.

The notification server computer 171 may then send each product control alert indicator to the second user 211 (step 410*a*). The notification server computer 171 may send a product control alert message to a user device (e.g. mobile device 200) associated with the second user 211, and this product control alert message can contain one or more product control alert indicators. The notification server computer may send the product control alert message to the user device based upon the payment account contact information determined in step 406*b*. This payment account contact information can include contact information for the user device.

In the above example, the notification server computer 171 may send the first product control alert indicator in a first product control alert message to the second user 211, and may send the second product control alert indicator in a second product control alert message to the second user 211. In alternative embodiments, both the first and second product control alert indicators may be sent in a single product control alert message.

In some embodiments, the notification server computer 171 may also generate a general alert message to send to the first user 110 who conducted the transaction (step 410*b*). Unlike the product control alert message(s) that are sent to the second user 211 in step 410*a*, the general alert message may not include the name and contact information of the first person. Other attributes of the general alert message may be similar to those of the product control alert message sent to the second user 211. In some embodiments, the notification server computer 171 may send a message to the first user 110 (step 410*b*) that is identical to the product control alert message sent to the second user 211 in step 410*a*. Thus, in embodiments of the invention, at least two alert messages with different content may be sent to two different persons.

The product control alert message may show the second user 211 what specific products a subsidiary user 110 has purchased (i.e., line item product information). The product control alert message may contain additional valuable information, such as loyalty program information for any of the products purchased, and whether any products requiring notification (e.g., prohibited products) have been purchased. After receiving the product control alert message for the recently purchased products, the second user 110 may retrieve any or all of the products from the first user 110, and return the product to the merchant, in step 412. The second user 211 may also contact the first user 110, to request that the first user 110 purchases additional items. For example, after receiving the product control alert message, the second user 211 may ask the first user 110 to purchase more shirts, to gain more loyalty points. After the first user purchases another shirt, another product control alert message can be generated and sent to the second user 211 (and optionally the first user 110). In certain implementations, either or both of the users may only be sent one product control alert message per product purchased or per loyalty program in a given time period. By limiting the messages sent, the consumer will not get overwhelmed by messages with repetitive data. However, the users may wish to receive a product control alert message for each purchase. The second user 211 or the first user 110 can save such alert preferences when registering for the product control alert messaging system, or at other times (such as through a web interface).

Figure 5A:
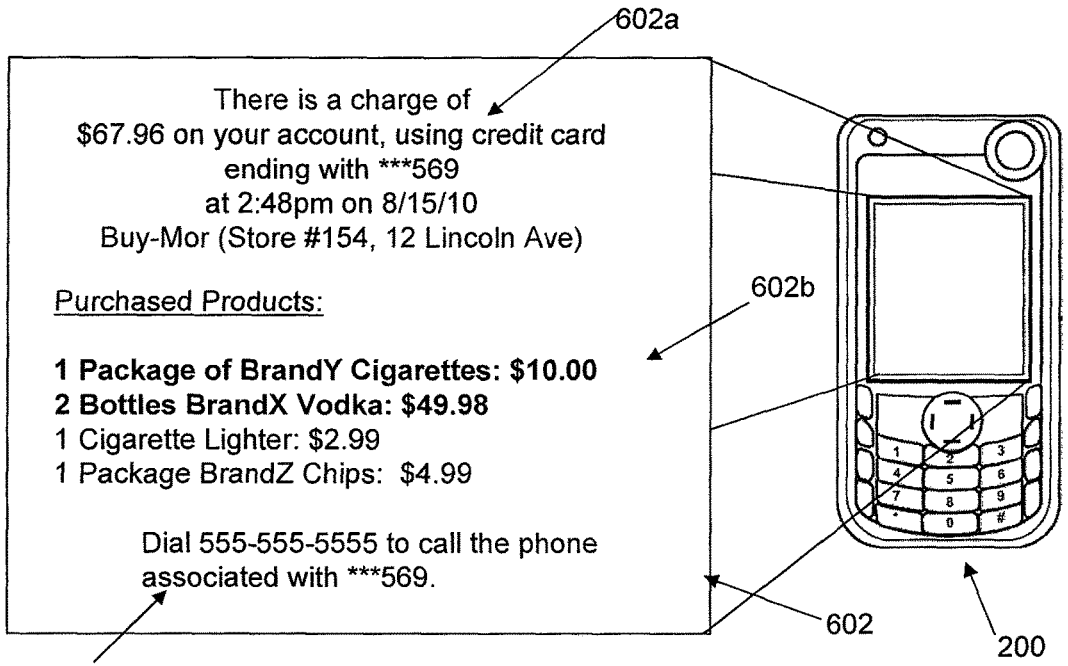
FIGS. 5A-5B show illustrations of product alert messages according to an embodiment of the invention.
Figure 5B:
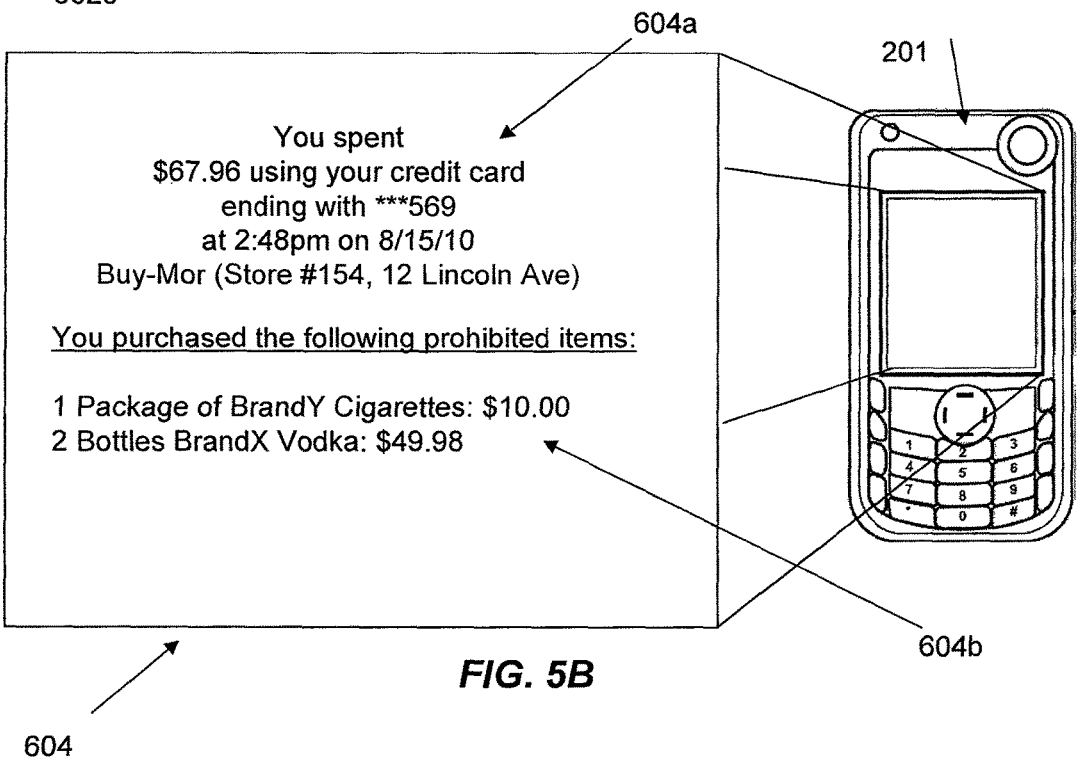

FIGS. 5A and 5B show examples of product control alert messages containing line item product data, according to certain embodiments of the invention. In FIG. 5A, a user device 200, such as a mobile phone associated with a second user 211, has received a product control alert message 602. In certain embodiments of the invention, the product control alert message 602 provides information relating to the transaction (name or account number, merchant name and location, amount of transaction, etc.) so that the recipient of the message can identify who conducted the purchase. For example, the product control alert message may contain the name and address of the first user 110 (not shown). In some embodiments, the product control alert message 602 may also include account information 602a to identify the account involved in the transaction. The account information on the product control alert message 602 may clearly identify the account associated with the transaction. In one embodiment, the account information on the alert does not include the full and complete account number in order to protect the information if the product control alert message 602 ever gets lost.

The product control alert message 602 may also include a listing of the products purchased in the transaction 602b. In some embodiments, all the products purchased in the transaction may be listed, along with their quantity and purchase price. In the embodiment shown in 602b, the price depicted is the total price for the quantity of products purchased, including tax. Thus, the total cost of the two bottles of BrandX Vodka is $49.98 (or $24.99 per bottle). In certain implementations, the purchased products that require notification are shown in bold, or otherwise highlighted, to signify their status to the message recipient. In other embodiments, only the products requiring notification are included in the product list 602b (i.e., purchased products that are not registered to require notification are not listed).

The product control alert message may also contain contact information 602c, such as a phone number, of the first user 110 so that the second user 211 may contact the person who conducted the transaction. In some embodiments, the contact information 602c can be a selectable link (e.g., a hyperlink) that is selectable by clicking on the name or phone number of the first user 110. These embodiments may be compatible with smartphones or certain touch-screen devices.

In FIG. 5B, a mobile device 201, associated with the first user 110, has received a product control alert message 604. The product control alert message 604 includes purchase information 604a similar to the information 602a sent in the product control alert message 602. The purchase information 604a may be tailored to the recipient however (e.g., the message recites "You"). This product control alert message 604 can also contain a list of products purchased, such as the list of products requiring notification (e.g. prohibited products) 604b. Although not shown, the product control alert message 604 may also include selectable contact information, to allow the first user 110 to easily contact the second user 211 or other suitable party.

The product control alert message 602 may be generated using a first product control alert message template, such as a template designated for the account holder. The product control alert message 604 may be generated using a second product control alert message template, such as a template designated for the user conducting the transaction. Embodiments of the invention also contemplate product control alert messages containing some or all the information shown in both product control alert messages 602 and 604. The messages may also include other information as described herein, such as loyalty program data.

C. Enrollment

In certain embodiments of the invention, prior to sending product control alert messages, the product control alert messaging service may first have one or more parties enrolled, and the databases and systems set up. In exemplary embodiments, there may be a program manager that coordinates the product control alert messaging service. In certain embodiments, the program manager may be the payment processing network 150, or an entity that is affiliated with the payment processing network 150. In other embodiments, the program manager may comprise the issuer 160, the acquirer 140, or other suitable entity.

Figure 6:
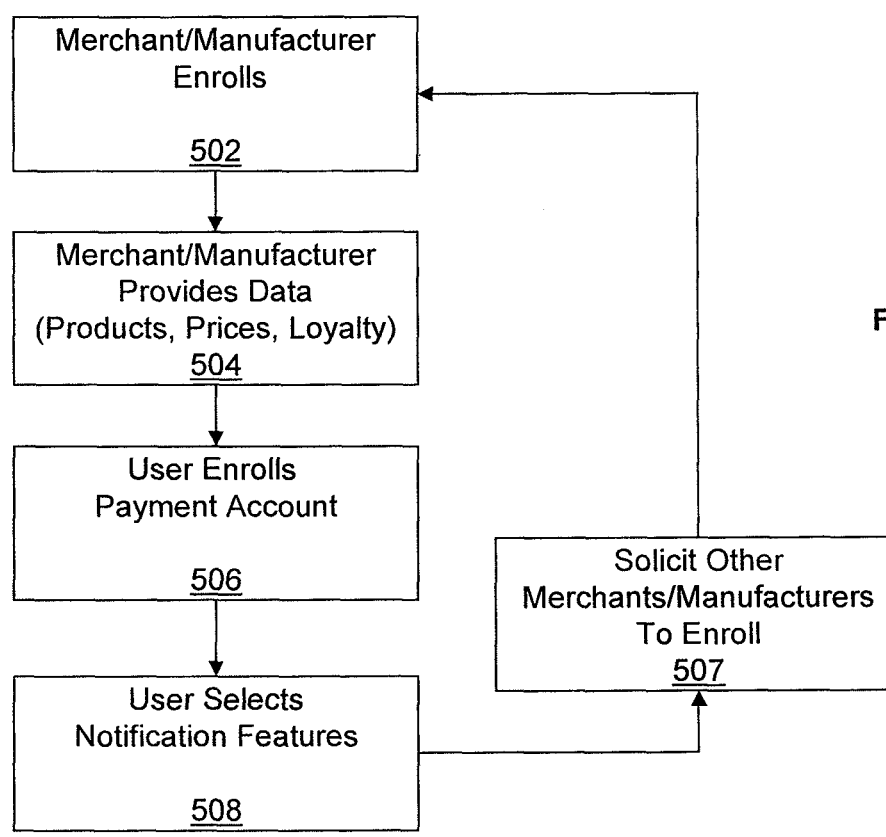
FIG. 6 shows a flowchart illustrating the steps involved in enrolling a user in an alert service.

FIG. 6 shows a method of enrolling both consumers, manufacturers, and merchants in a product control alert messaging service, according to an embodiment of the invention. In order to receive the product control alert messages associated with a transaction, the second user 211 enrolls in the notification service provided by the alert system 100 (such as the product control alert messaging service) prior to the first user 110 conducting a transaction. Similarly, the program manager may receive and store the information to be used in the product control alert messages, such as product identifiers, product data, etc. This process will be explained in further detail below with reference to the method of FIG. 6.

The merchant or manufacturer can enroll in the product control alert messaging service (step 502). The product control alert messaging service may also receive and store the product data, including product identifiers, product names, loyalty program information, etc., in step 504. In certain implementations, steps 502 and 504 may happen simultaneously. That is, the product control alert messaging service may receive the product identifiers at the same time as enrollment. An example is when a merchant transmits SKU numbers (i.e., product identifiers) along with pricing information for the products (i.e., product data), to the product control alert messaging service upon enrollment. The program manager can store the product data, indexed to the registry of product identifiers, in the product control database 190. In exemplary embodiments, the program manager may have agreements with manufacturers and merchants to periodically receive (e.g. daily, monthly, quarterly, etc.) product identifiers. For example, a manufacturer may maintain a computer database of all the products the manufacturer produces, along with the associated product identifiers. The manufacturer may have a computer automatically transfer (i.e., upload) the information in this database at regular intervals to the product identifier database 190, or whenever the manufacturer database is updated. The database information can be transferred over a suitable computer network, such as the Internet or the payment processing network 150. In some implementations, the manufacturer may only upload the changes to the database.

A user, such as the second user 211, may enroll in the product control alert service, in step 506. Step 506 may occur before, after, or concurrently with merchant and/or manufacturer enrollment. There may be multiple ways in which the second user 211 may become enrolled in the product control alert service. In some embodiments, the second user 211 may be enrolled automatically by the issuer 160 that issues the portable consumer device 120. Enrollment for the second user 211 may also be done in a batch mode, by file delivery from issuer 160 or by file delivery from some other party. In other embodiments, issuer 160 or payment processing network 150 may provide the messaging service as an option to the second user 211 at which time the second user 211 may enroll in the messaging service either by contacting a customer service representative over the phone (provided either by issuer 160 or payment processing network 150), or by accessing a web site and filling out an online application.

In certain embodiments of the invention, the second user 211 can have multiple subsidiary users on the payment account. Each user (including the account holder plus the subsidiary users) associated with the payment account may have a portable consumer device 120. In one implementation, the portable consumer device 120 can contain the account number and a device identifier associated with that account number. In a second implementation of the invention, the portable consumer device 120 can contain a unique account identifier, and the unique account identifier of each portable consumer device 120 can be associated with the payment account.

During the enrollment process, the second user 211 (i.e., the account holder) can add new users or update existing users associated with the payment account held by the second user 211 (i.e., add or update subsidiary users). For each user associated with the account, the second user 211 can provide information for that user, such as name, mobile device information, portable consumer device identifier or unique account identifier, contact information, etc. For example, the parent in a family may be the second user 211 and may be the account holder of an account associated with a payment card. The parent may then enroll a spouse and a teenage child in the service. Either the spouse or the child may be a first user 110. The parent may provide the spouse and teenage child's mobile phone numbers, credit card information (for each user's card that is linked to the account), etc., during the enrollment process. The alert system 100 can then use this data along with product identifiers received during a transaction to generate and deliver the product control alert messages. The second user 211 may access the Web site or contact the issuer 160 to change her information at any time.

In one embodiment, the second user 211 may also select notification features (i.e., alert preferences) during the enrollment process (step 508). The second user 211 may set notification features such as the language preference and preferred delivery channels of the contact alert message. For example, the second user 211 may specify during the enrollment process that she would like to receive the product control alert messages in a particular language. The second user 211 may also specify whether the alert message will be send to a user on her mobile device 200, or at a particular e-mail address. In certain embodiments, the user can specify when to receive a product control alert message. For example, the second user 211 may select to only receive product control alert messages for specific types of products or at certain times, such alerts regarding prohibited products, or alerts regarding purchases made on the weekdays, etc.

The user may also select to receive product control alert messages for specific product identifiers (e.g., the consumer enters the specific product identifier), or groups of product identifiers (e.g., SKU categories). In one embodiment of the invention, the second user 211 may register a list of products requiring notification, during the enrollment process. In some implementations, the account may account may have one or more subsidiary accounts, each having a respective list of products requiring notification, and "registering a list or products requiring notification" can comprise registering each respective list of products. The second user 211 may choose to receive a product control message each time a subsidiary account is used to purchase a product on its respective list of products requiring notification.

The list of products requiring notification can comprise prohibited products (i.e. products the account holder does not want a subsidiary user to purchase). The list may also comprise products that the account holder would like to keep track of (e.g., such as to coordinate purchases among family members.) For example, the alert messages can be used by the account holder to ensure that too much of a given product is not purchased (e.g., food or other products that can spoil if not used in time). Thus, any subsequent transaction for a product on this list may result in a notification message being sent to the second user 211. The second user 211 may also select to receive only alert messages regarding loyalty programs, alerts regarding prohibited products or products otherwise requiring notification, or other types of alert messages. In some implementations, the second user 211 may select the number or frequency of product control alert messages that she may receive for a particular product (e.g., for a specific product identifier). Thus, the second user 211 may choose to only receive one product control alert message per week for a given product. In another example, the second user 211 may choose to only receive up to five product control alert messages for a given product. In exemplary embodiments, the second user 211 can select from any or all of the above preference options.

The information that the second user 211 provides can be stored in the database 173 in the form of consumer enrollment data 176, as shown in FIG. 2. In other embodiments, the information can be stored in other locations, such as the product control database 190, or in a mix of locations, such as both database 173 and database 190. The data (e.g. alert preferences), sometimes referred to as product control alert preference data, in addition to the product control data 190c, can be used by the notification server computer 171 to generate the product control alert messages.

The program manager may also solicit other manufacturers or merchants to enroll themselves in step 507. The program manager may select merchants or manufacturers to solicit from given lists, such as the list of merchants that sell a product from a given manufacturer (and vice versa), entities that are listed in a database such as the better business bureau, or that have a relationship with the program manager. In some implementations, the program manager may determine other merchants and manufacturers to solicit based on the product control alert preferences received in step 508. For example, a user may indicate when setting the preferences that she would like to receive notifications regarding a product produced by a first manufacturer, and to receive notifications regarding products sold by a first merchant. The program manager can then solicit the first manufacturer and the first merchant to enroll in the product control alert messaging service (step 502), to increase the network effects of the program and provide a greater range of customer notifications.

III. Portable Consumer Devices and Computer Apparatuses

Figure 7:
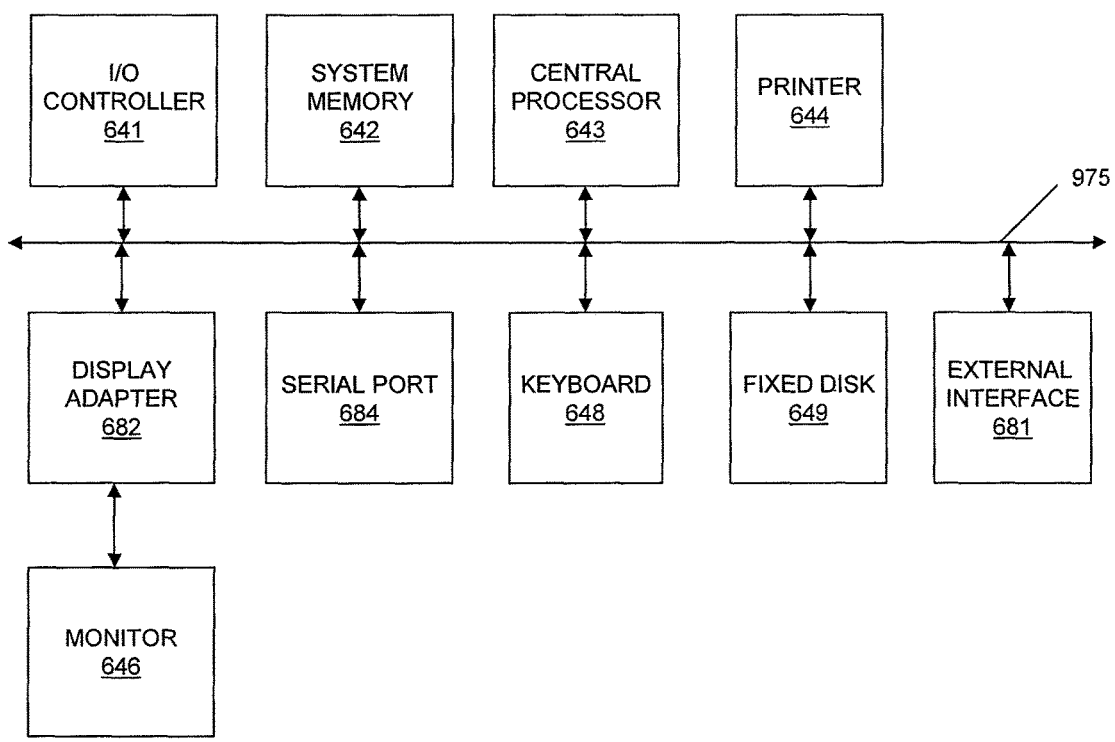
FIG. 7 shows a high-level block diagram of a computer apparatus.

The various participants and elements in FIGS. 1 and 2 may operate one or more computer apparatuses to facilitate the functions described herein. Any of the elements in FIGS. 1 and 2 may use any suitable number of subsystems to facilitate the functions described herein. Examples of such subsystems or components are shown in FIG. 7. The subsystems shown in FIG. 7 are interconnected via a system bus 645. Additional subsystems such as printer 644, keyboard 648, fixed disk 649, monitor 646, which is coupled to display adapter 682, and others are shown. Peripherals and input/output (I/O) devices, which couple to I/O controller 641, can be connected to the computer system by any number of means known in the art, such as serial port 684. For example, serial port 684 or external interface 681 can be used to connect the computer apparatus to a wide area network such as the Internet, a mouse input device, or a scanner. The interconnection via system bus 645 allows a central processor 643 to communicate with each subsystem and to control the execution of instructions from system memory 642 or fixed disk 649, as well as the exchange of information between subsystems. The system memory 642 and/or fixed disk 649 may embody a computer readable medium, such as a tangible (i.e., physical or durable) computer readable medium. The computer readable medium may take the form of a hard drive, flash memory, magnetic strip, optical device, or other memory.

Figure 8:
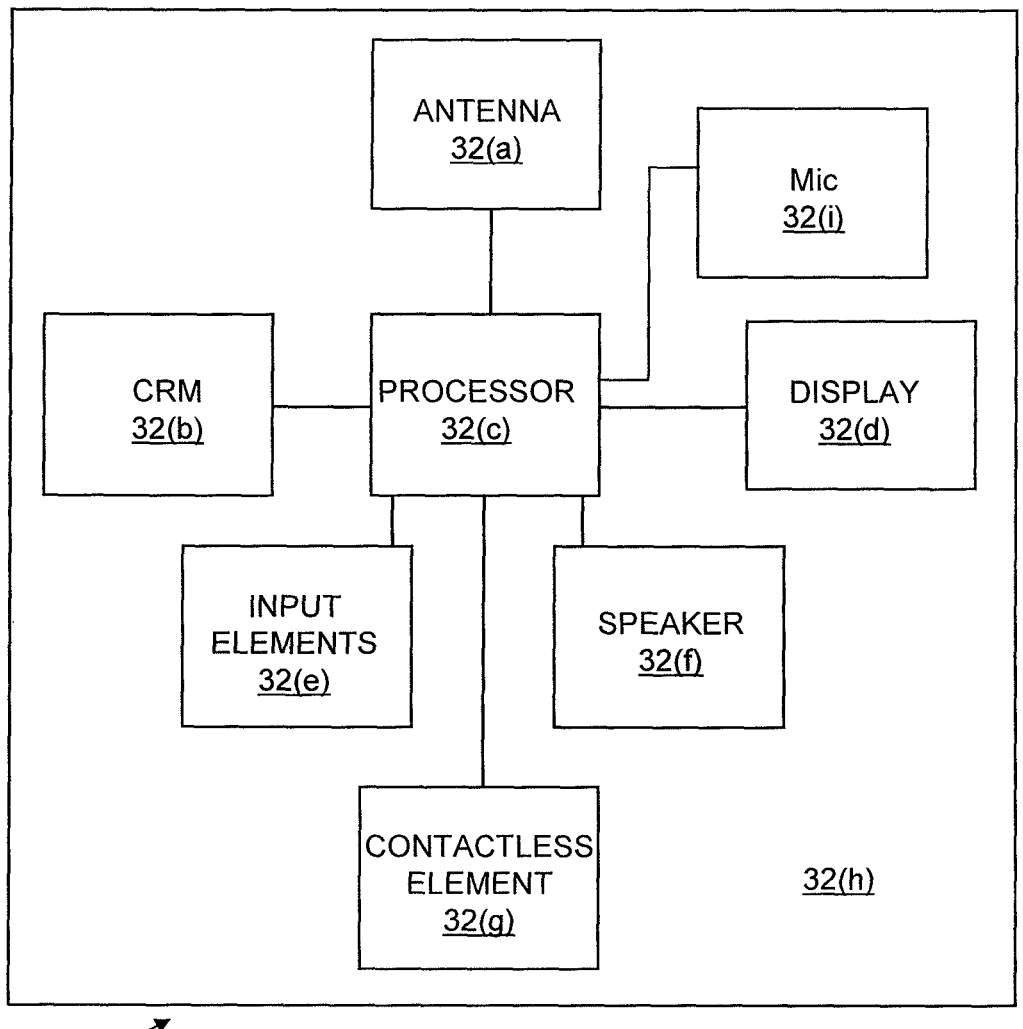
FIG. 8 shows a block diagram of a mobile device.

FIG. 8 shows block diagram of a mobile device, such as a wireless phone, and subsystems that may be present in computer apparatuses in systems according to embodiments of the invention. An exemplary portable consumer device 500 in the form of a mobile device may comprise a computer readable medium and a body as shown in FIG. 8. (FIG. 8 shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory, such as a tangible (i.e. physical or durable) memory that stores data and may be in any suitable form including a hard drive, magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile device 500 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 500 and an interrogation device. Thus, the portable consumer device 500 is capable of communicating and transferring data and/or control instructions via both cellular network and near field communications capability.

The portable consumer device 500 may also include a processor 32(c) (e.g., a microprocessor or a group of processors working together) for processing the functions of the portable consumer device 500 and a display 32(d) to allow a consumer to see phone numbers and other information and messages. The portable consumer device 500 may further include input elements 32(e) to allow a consumer to input information into the device, a speaker 32(f) to allow the consumer to hear voice communication, music, etc., and a microphone 32(i) to allow the consumer to transmit her voice through the portable consumer device 500. The portable consumer device 500 may also include an antenna 32(a) for wireless data transfer (e.g., data transmission).

Embodiments of the invention have a number of technical advantages. Certain embodiments of the invention can provide alert messages that contain product-specific information, such as notifications that a prohibited product was recently purchased, or a certain product earned rewards. Conventional transaction systems do not transmit product data during payment processing, and therefore cannot produce such product specific messages. In embodiments of the invention disclosed herein, product identifiers may be transmitted, along with other payment information, during payment processing. In other embodiments of the invention disclosed herein, product identifiers may be analyzed by systems located at or nearby the merchant. Such "edge" systems can complement the payment processing systems, and can allow for the benefits of product specific messaging without changing the underlying transaction processing systems.

Embodiment of the invention can allow consumers to receive messages with specific, targeted information. These messages can contain product specific data, and thus can provide benefits based upon the actual products purchased. For example, embodiments of the invention can alert a second person of a transaction that a first person is conducting using a product control alert message. This message can include the names or other identifiers of the products purchased. One of the benefits of receiving alert messages of products purchased by a first person, by the second person, is that the second person is made aware of where the first person is, and what the first person is purchasing. For example, the first person may conduct a transaction at a convenience store. Without the product name or other product control data, the second person will not have a true understanding of what the first person is doing, due to the wide variety of products sold at such stores. By including the name or other identifier of the product, the second person will be fully apprised of the transaction.

Furthermore, if the second person is made of aware of where the first person is and what the first person is purchasing (e.g., the specific products purchased), then the second person can easily contact the first person shortly after the first person has conducted a transaction. The second person can ask the first person where he or she is, why they are conducting the current purchase, what is being purchased, if additional purchases can be made, if other errands close to the merchant can be run, etc. Thus, embodiments of the invention allow different persons using the same payment account to easily communicate with each other, substantially contemporaneously with a transaction being conducted.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, an optical medium such as a CD-ROM, or other physical memory devices. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by a notification server computer, from an account holder of a payment account, a list of products to trigger notifications when purchased with the payment account by a first user, wherein the account holder is a second user that is different from the first user;
   storing, by the notification server computer, in a database, the list of products and corresponding product identifiers as product control data for the payment account;
   receiving, by a payment processing network server computer, an authorization request message from a merchant access device, the authorization request message including transaction data for a transaction conducted by the first user against the payment account, the transaction data including a plurality of product identifiers for a plurality of products, and the transaction data further including a payment account identifier associated with the payment account;
   forwarding, by the payment processing network server computer, the transaction data to the notification server computer;
   accessing, by the notification server computer, based on the payment account identifier, the product control data for the payment account, the product control data including the list of products and corresponding product identifiers in the database;
   determining, by the notification server computer, that the plurality of product identifiers in the transaction data includes at least one matching product identifier that is also associated with the product control data;
   accessing, by the notification server computer, the database to obtain payment account contact information associated with the payment account identifier, the payment account contact information including contact information for a second user device associated with the second user;
   generating, by the notification server computer, a product control alert message including a product control alert indicator for the at least one matching product identifier, the product control alert indicator including a product name, and the product control alert message further including other product names for other products in the plurality of products, wherein the product control alert indicator is highlighted in the product control alert message;
   sending, by the notification server computer, the product control alert message to the second user device;
   forwarding, by the payment processing network server computer, the authorization request message to an issuer computer of the payment account for authorization of the transaction;
   receiving, by the payment processing network server computer, an authorization response message from the issuer computer when the transaction is authorized; and
   forwarding, by the payment processing network server computer, the authorization response message to the merchant access device to complete the transaction.

2. The method of claim 1, wherein the second user device is a mobile phone.

3. The method of claim 1, wherein the product control data includes a list of prohibited product identifiers.

4. The method of claim 1, wherein the database is located on an edge of a payment processing network that comprises the payment processing network server computer, and wherein the transaction data is received by the payment processing network server computer in an extensible markup language (XML) format and further comprises an expiration date associated with the payment account identifier.

5. The method of claim 1, wherein the product control alert message further includes loyalty program information for the at least one matching product identifier.

6. A system comprising:
   a database;
   a payment processing network server computer coupled to the database, wherein the payment processing network server computer comprises a first processor and a first computer-readable medium coupled to the first processor, the first computer-readable medium comprising code executable by the first processor for implementing a first method comprising receiving, by the payment processing network server computer, an authorization request message from a merchant access device, the authorization request message including transaction data for a transaction conducted by a first user against a payment account, the transaction data including a plurality of product identifiers for a plurality of products, and the transaction data further including a payment account identifier associated with the payment account, forwarding, by the payment processing network server computer, the transaction data to a notification server computer, forwarding, by the payment processing network server computer, the authorization request message to an issuer computer of the payment account for authorization of the transaction, receiving, by the payment processing network server computer, an authorization response message from the issuer computer when the transaction is authorized, and forwarding, by the payment processing network server computer, the authorization response message to the merchant access device to complete the transaction; and the notification server computer comprising a second processor and a second computer-readable medium coupled to the second processor, the second computer-readable medium comprising code executable by the second processor for implementing a second method comprising receiving, from an account holder of the payment account, a list of products to trigger notifications when purchased with the payment account by the first user, wherein the account holder is a second user that is different from the first user, storing, in the database, the list of products and corresponding product identifiers as product control data for the payment account, receiving, from the payment processing network server computer, the transaction data, accessing, by the notification server computer, based on the payment account identifier in the transaction data, the product control data for the payment account, the product control data including the list of products and corresponding product identifiers in the database, determining that the plurality of product identifiers in the transaction data includes at least one matching product identifier that is also associated with the product control data, accessing the database to obtain payment account contact information associated with the payment account identifier, the payment account contact information including contact information for a second user device associated with the second user, generating, by the notification server computer, a product control alert message including a product control alert indicator for the at least one matching product identifier, the product control alert indicator including a product name, and the product control alert message further including other product names for other products in the plurality of products, wherein the product control alert indicator is highlighted in the product control alert message, and sending, by the notification server computer, the product control alert message to the second user device.

7. The system of claim 6, wherein the payment processing network server computer is in a payment processing network configured to process the transaction.

8. The method of claim 1 wherein the product control alert indicator is formed from a standard template, and the product name and a cost are inserted into the standard template.

9. The method of claim 1 wherein the product control alert indicator is highlighted by bolding the product control alert indicator.

10. The method of claim 1 wherein the authorization request message comprises a merchant category code.

11. The method of claim 1 wherein the product identifiers in the plurality of product identifiers are hashed in the authorization request message.

12. The method of claim 1 wherein the product control alert message comprises a phone number of a phone operated by the first user.

13. The method of claim 1 wherein the product control alert message further comprises a time and date of the transaction and a name of a merchant that conducted the transaction.

14. The method of claim 1, further comprising:
sending, by the notification server computer, the product control alert message to a first user device of the first user.

15. The method of claim 1 wherein the product control alert message further comprises a location of a merchant that conducted the transaction.

16. The method of claim 1, further comprising:
accessing, by the notification server computer, the database to obtain first contact information for a first user device associated with the first user; and
sending, by the notification server computer, the product control alert message to the first user device.

17. The method of claim 1, further comprising:
accessing, by the notification server computer, the database to obtain first contact information for a first user device associated with the first user, wherein the product control alert message further includes the first contact information for the first user device, and wherein after sending the product control alert message to the second user device, the second user uses the second user device and the first contact information to contact the first user at the first user device.

18. The method of claim 1, further comprising:
accessing, by the notification server computer, the database to obtain first contact information for a first user device associated with the first user, wherein the product control alert message further includes the first contact information in a form of a selectable hyperlink, and
wherein after sending the product control alert message to the second user device, the second user device displays the selectable hyperlink and the second user selects the selectable hyperlink, and
wherein, in response to the second user selecting the selectable hyperlink, the second user device uses the first contact information to contact the first user at the first user device.

19. The method of claim 1, wherein the notification server computer receives the list of products to trigger notifications from the account holder through a web interface.

20. The method of claim 1, further comprising:
receiving, by the notification server computer, from the second user through a web interface, the contact information for the second user device associated with the second user;
receiving, by the notification server computer, from the second user through the web interface, contact information for a first user device associated with the first user; and
storing, by the notification server computer, in the database, the contact information for the second user device and the contact information for the first user.

* * * * *